United States Patent
Li

(10) Patent No.: US 12,229,209 B2
(45) Date of Patent: Feb. 18, 2025

(54) SYSTEMS AND METHODS FOR HOST NAME BASED NETWORK DEVICE PRE-RECOGNITION AND DISCOVERY

(71) Applicant: Fortinet, Inc., Sunnyvale, CA (US)

(72) Inventor: Haitao Li, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 396 days.

(21) Appl. No.: 17/185,699

(22) Filed: Feb. 25, 2021

(65) Prior Publication Data

US 2022/0269737 A1 Aug. 25, 2022

(51) Int. Cl.
| | |
|---|---|
| *G06F 16/955* | (2019.01) |
| *G06F 16/9532* | (2019.01) |
| *G06F 16/9538* | (2019.01) |
| *G06F 18/22* | (2023.01) |
| *H04L 41/0893* | (2022.01) |

(52) U.S. Cl.
CPC ........ *G06F 16/955* (2019.01); *G06F 16/9532* (2019.01); *G06F 16/9538* (2019.01); *G06F 18/22* (2023.01); *H04L 41/0893* (2013.01)

(58) Field of Classification Search
CPC .............. G06F 16/955; G06F 16/9532; G06F 16/9538; G06K 9/6215; H04L 41/0893
See application file for complete search history.

(56) References Cited

U.S. PATENT DOCUMENTS

| | | | |
|---|---|---|---|
| 9,330,258 B1* | 5/2016 | Satish | H04L 63/1441 |
| 2008/0040777 A1* | 2/2008 | Aihara | H04L 12/1471 726/4 |
| 2017/0063930 A1* | 3/2017 | Chesla | H04L 63/1425 |
| 2018/0191593 A1* | 7/2018 | De Knijf | H04L 41/50 |
| 2020/0387746 A1* | 12/2020 | Tedaldi | G06K 9/6218 |
| 2021/0042442 A1* | 2/2021 | Al-Kabra | H04L 67/10 |

* cited by examiner

*Primary Examiner* — Mariela Reyes
*Assistant Examiner* — Fernando M Mari Valcarcel
(74) *Attorney, Agent, or Firm* — Jaffery Watson; Hamilton & DeSanctis LLP

(57) ABSTRACT

Various approaches for identifying possible unsecured devices on a network as set forth. In some cases, approaches discussed relate to systems and methods for identifying possible unsecured devices based upon a host name for each of the discovered devices.

20 Claims, 7 Drawing Sheets

| Device (Brand, Model) 362 | Device Type 364 | URLs 366 | Keyword Strings Set 368 |
|---|---|---|---|
| Dell Inspiron 7780 | Laptop | URL 1 | K1, K2, ...... KL |
| | | URL 2 | K1, K2, ...... KM |
| | | URL N | K1, K2, ...... KN |

SYSTEMS AND METHODS FOR HOST NAME BASED NETWORK DEVICE PRE-RECOGNITION AND DISCOVERY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network security, and more particularly to identifying unsecured network devices.

Description of the Related Art

The Internet of Things (hereinafter "IoT" or "IOT") is a system of interrelated computing devices, mechanical and digital machines provided with unique identifiers (UIDs) and the ability to transfer data over a network without requiring human-to-human or human-to-computer interaction. The number of IoT devices is increasing day each passing day and even as IoT device volume races towards 200 billion by 2020, the vast majority of these devices still have little or no security features in place, leaving them vulnerable to cyber-attacks. IoT devices are increasingly performing important roles in many areas of a modern economy, including facilities for manufacturing, utilities, distribution, recreation, military, residential, commercial, healthcare, and others. IoT devices deal with data that may be personal and may have significant business impacts. Vulnerabilities of IoT devices are a major concern for individuals and organizations. The IoT devices, if compromised, could give hackers not only extra soldiers for a malicious botnet, but also electronic eyes and ears to monitor our lives from afar.

Hence, there exists a need in the art for advanced systems and methods for mitigating security concerns related to IoT and other types of network devices.

SUMMARY

Various embodiments provide systems and methods for identifying possible unsecured devices on a network. In some cases, embodiments discussed relate to systems and methods for identifying possible unsecured devices based upon a host name for each of the discovered devices.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
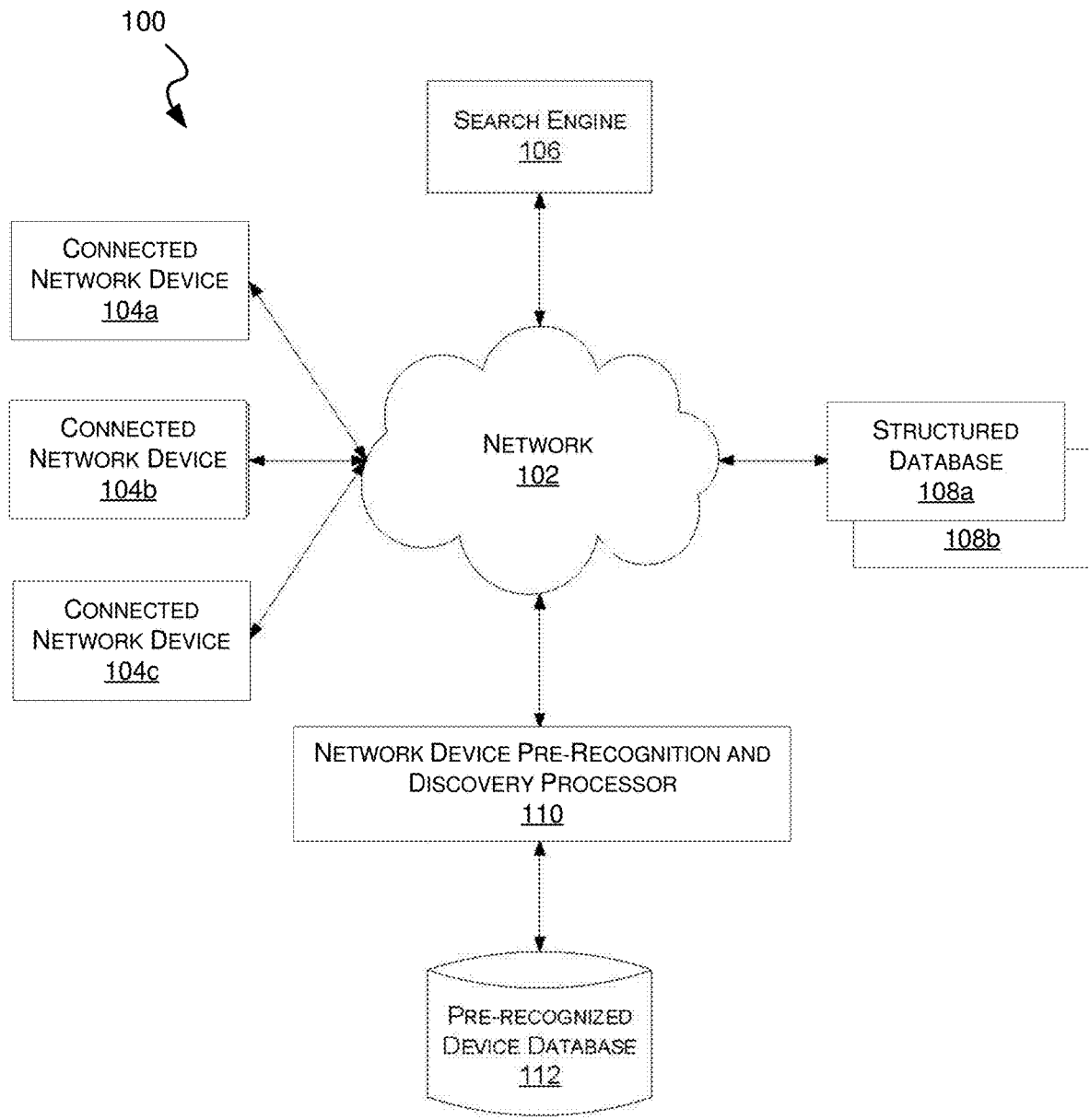
FIGS. 1A-1C depict a network device pre-recognition and discovery system in accordance with some embodiments.

Various embodiments provide systems and methods for identifying possible unsecured devices on a network. In some cases, embodiments discussed relate to systems and methods for identifying possible unsecured devices based upon a host name for each of the discovered devices.

The Internet of Things (IoT) is being hailed as the next wave revolutionizing our society. Smart homes, enterprises, and cities are increasingly being equipped with a plethora of IoT devices. A network managing device managing security of connected devices needs to know what kind of IoT devices are connected to a network to apply appropriate security policies and measures. Similarly, a governing body or law enforcement agency may also want to understand how many and what kind of IoT devices are presently active in their territory. To understand what kind of IoT devices are deployed or connected to a managed security environment, it is desired to recognize these devices. A network managing device can only see the hostname of connected devices during device discovery operations. In some cases, the hostname does not convey enough information on what type of IoT device, the brand of IoT device, and the functional capabilities of the IoT device. For example, the hostname "galaxy-j7-refine" is the default name of the Samsung Galaxy j7 smartphone. Some of the existing methods generally recognize the IoT devices by parsing brand and model from the hostname. Such straightforward methods seem reasonable but may fail in many cases. It has been observed that for many IoT devices, there may not be enough information in the hostname to parse the brand and model directly. For example, a hostname RM-1072" of a mobile device is a "Microsoft Lumia 640 LTE" device, but it is not easy to recognize the brand and model from the hostname.

Various embodiments discussed herein, provide for discovering network devices, including IoT devices, based in part upon the host name of the network device.

Some embodiments provide methods for classifying network devices. The methods include: identifying, by a processor, a host name of a connected network device on a network; extracting, by the processor, at least a first keyword string from the host name; launching, by the processor, a web search using at least the first keyword string to retrieve at least a first universal record locator (URL); accessing, by the processor, a first pre-recognized network device record, where the first pre-recognized network device record indicates a first device type and includes at least a second URL; calculating, by the processor, a similarity between the first URL and the second URL to yield a first similarity value; accessing, by the processor, a second pre-recognized network device record, where the second pre-recognized network device record indicates a second device type and includes a third URL; calculating, by the processor, a similarity between the first URL and the third URL to yield a second similarity value; and associating, by the processor, the connected network device with the first device type based at least in part on a comparison of the first similarity value and the second similarity value. In some cases the first keyword string includes at least a brand name and a model number.

In some instances of the aforementioned embodiments where the web search is a first web search and the processor is a first processor, the methods may further include forming the first pre-recognized network device record. Such forming includes: accessing, by a second processor, a structured database to retrieve a list of network devices; extracting, by the second processor, at least a second keyword string from a network device listing in the list of network devices; and launching, by the second processor, a second web search using at least the second keyword string to retrieve at least the second URL. In some cases, the methods further include: storing, by the second processor, the first pre-recognized network device record to a pre-recognized device database.

In various cases where the list of network devices is a first list of network devices, the methods may further include forming the second pre-recognized network device record. Such forming includes: accessing, by the second processor, the structured database to retrieve a second list of network devices; extracting, by the second processor, at least a third keyword string from a network device listing in the second list of network devices; launching, by the second processor, a third web search using at least the third keyword string to retrieve at least the third URL. In some cases, the first processor is the same as the second processor. In various cases, the list of network devices may be, but is not limited to: a list of laptop computers, a list of desktop computers, a list of tablet computers, a list of mobile telephones, a list of audio input devices, a list of audio output devices, a list of video input devices, a list of video output devices, or a list of home appliance devices.

In various instances of the aforementioned embodiments where the web search is a first web search and the processor is a first processor, the methods may further include forming the first pre-recognized network device record. Such forming may include: accessing, by a second processor, a structured database to retrieve a list of network devices; extracting, by the second processor, at least a second keyword string from a network device listing in the list of network devices; launching, by the second processor, a second web search using at least the second keyword string to retrieve at least the second URL and a fourth URL; storing, by the second processor, the first pre-recognized network device record to a pre-recognized device database, where the first pre-recognized network device record further includes the fourth URL; and calculating, by the first processor, a similarity between the first URL and the fourth URL to yield a third similarity value. In such an instance, associating the connected network device with the first device type is based at least in part on a comparison of: the first similarity value and the second similarity value, and the third similarity value and the second similarity value.

In some instances of the aforementioned embodiments, calculating, by the processor, the similarity between the first URL and the second URL to yield the first similarity value includes calculating a Jaccard index between the first URL and the second URL to yield a Jaccard index value, and wherein the first similarity value is the Jaccard index value. In some cases, associating, by the processor, the connected network device with the first device type when the first similarity value is greater than the second similarity value.

Other embodiments provide non-transitory computer-readable storage media embodying a set of instructions, which when executed by one or more processing resources of a computer system, causes the one or more processing resources to perform a method including: forming a first pre-recognized network device record and forming a second pre-recognized network device record. Forming the first pre-recognized network device record includes: accessing a structured database to retrieve a first list of network devices; extracting at least a first keyword string from a network device listing in the first list of network devices; and launching a first web search using at least the first keyword string to retrieve at least a first URL. Forming the second pre-recognized network device record includes: accessing the structured database to retrieve a second list of network devices; extracting at least a second keyword string from a network device listing in the second list of network devices; and launching a second web search using at least the second keyword string to retrieve at least a second URL. The method further includes: storing the first pre-recognized network device record to a pre-recognized device database, where the first pre-recognized network device record includes at least a portion of the network device listing in the first list of network devices and the first URL; and storing the second pre-recognized network device record to the pre-recognized device database, where the second pre-recognized network device record includes at least a portion of the network device listing in the second list of network devices and the second URL.

In some instances the first list of network devices is: a list of laptop computers, a list of desktop computers, a list of tablet computers, a list of mobile telephones, a list of audio input devices, a list of audio output devices, a list of video input devices, a list of video output devices, or a list of home appliance devices.

Yet other embodiments provide non-transitory computer-readable storage media embodying a set of instructions, which when executed by one or more processing resources of a computer system, causes the one or more processing resources to perform a method includes: identifying a host name of a connected network device on a network; extracting at least a first keyword string from the host name; launching a web search using at least the first keyword string to retrieve at least a first URL; accessing a first pre-recognized network device record, where the first pre-recognized network device record indicates a first device type and includes at least a second URL; calculating a similarity between the first URL and the second URL to yield a first similarity value; accessing a second pre-recognized network device record, where the second pre-recognized network device record indicates a second device type and includes a third URL; calculating a similarity between the first URL and the third URL to yield a second similarity value; and associating the connected network device with the first device type based at least in part on a comparison of the first similarity value and the second similarity value.

Yet other embodiments provide network device classification systems. The systems include at least one processor and a memory. The memory includes instructions executable by the at least one processor to: identify a host name of a connected network device on a network; extract at least a first keyword string from the host name; launch a web search using at least the first keyword string to retrieve at least a first URL; access a first pre-recognized network device record, wherein the first pre-recognized network device record indicates a first device type and includes at least a second URL; calculate a similarity between the first URL and the second URL to yield a first similarity value; access a second pre-recognized network device record, where the second pre-recognized network device record indicates a second device type and includes a third URL; calculate a similarity between the first URL and the third URL to yield a second similarity value; and associate the connected network device with the first device type based at least in part on a comparison of the first similarity value and the second similarity value.

In some instances of the aforementioned embodiments where the memory is a first memory, the web search is a first web search, and the processor is a first processor, the systems may further include; a second processor and a second memory. The second memory includes instructions executable by the second processor to: access a structured database to retrieve a list of network devices; extract at least a second keyword string from a network device listing in the list of network devices; launch a second web search using at least the second keyword string to retrieve at least a second URL; and store the first pre-recognized network device record to a database. The first pre-recognized network device record includes at least the second URL and a portion of the network device listing in the list of network devices.

In some cases, the first processor is the same as the second processor. In other cases, the first processor is different from the second processor. In some cases, the first memory and the second memory are included in the same memory device. In other cases, the first memory and the second memory are included in different memory devices.

Embodiments of the present invention include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

Terminology

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, the phrase "network device" is used in its broadest sense to mean any device accessible via a network. In some cases, the network devices are IoT devices as are known in the art. Such IoT devices may include, but are not limited to, televisions, cameras, voice command devices, and the like. Based upon the disclosure provided herein, one of ordinary skill in the art will recognize a variety of network devices to which embodiments disclosed herein may be applied.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein a "network resource" generally refers to various forms of data, information, services, applications, and/or hardware devices that may be accessed via a network (e.g., the Internet). Non-limiting examples of network resources include web applications, cloud-based services, network devices, and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Turning to FIG. 1A, a conceptual block diagram 100 is shown that includes a network device pre-recognition and discovery system 110 deployed in relation to one or more networks 102 in accordance with various embodiments. As shown, network device pre-recognition and discovery system 110 is coupled to a pre-recognized device database 112. It is noted that while network device pre-recognition and discovery system 110 is shown coupled to one network in this embodiment, that it can be coupled to any number of networks. Network 102 communicably couples a large number of connected network devices 104 (in this case, connected network device 104a, connected network device 104b, and connected network device 104c), one or more search engines 106, and one or more structured databases 108.

A connected network device 104 is a network device that is coupled to a network such that its host name is visible when accessing the network. A structured data base 108 is any database that lists network devices. For example, Amazon™ includes a structured database where a user can search for network devices and the search returns a list of available network devices that, in this example, are offered for sale. A manufacturer often also provides Internet access to a structured database where a user can access information about devices offered by the manufacturer. Based upon the disclosure provided herein, one of ordinary skill in the art will recognize a variety of structured databases that may be used in relation to different embodiments of the present invention. Search engine(s) 106 may be any accessible search engines known in the art including, but not limited to, Google™, Bing™, and Yahoo™.

Network device pre-recognition and discovery system 110 performs at least three processes: pre-recognizing network devices, updating pre-recognized device database 112 based on the pre-recognizing process, and discovering one or more connected network devices 104 using information maintained in pre-recognized device database 112.

In operation, the aforementioned pre-recognizing network devices and updating pre-recognized device database 112 includes accessing a list of network devices from a structured database 108. This can include the network device pre-recognition and discovery system 110 accessing any structured database 108 that is available, and accessing a list of network devices from such a structured database 108. As a particular example, a search for a particular type of network device may be performed at the Amazon.com™ webpage. In turn, the webpage responds by listing a number of the particular type of network devices that are available. It is noted that while Amazon.com™ is used as an example structured database 108 that can be accessed, that any structured database 108 may be used in accordance with embodiments discussed herein. As another example, a list of known manufacturers of network devices may be maintained. For each device manufacturer on the list, a website of the device manufacturer can be accessed to obtain lists of models of network devices available from the manufacturer.

Figure 3A:
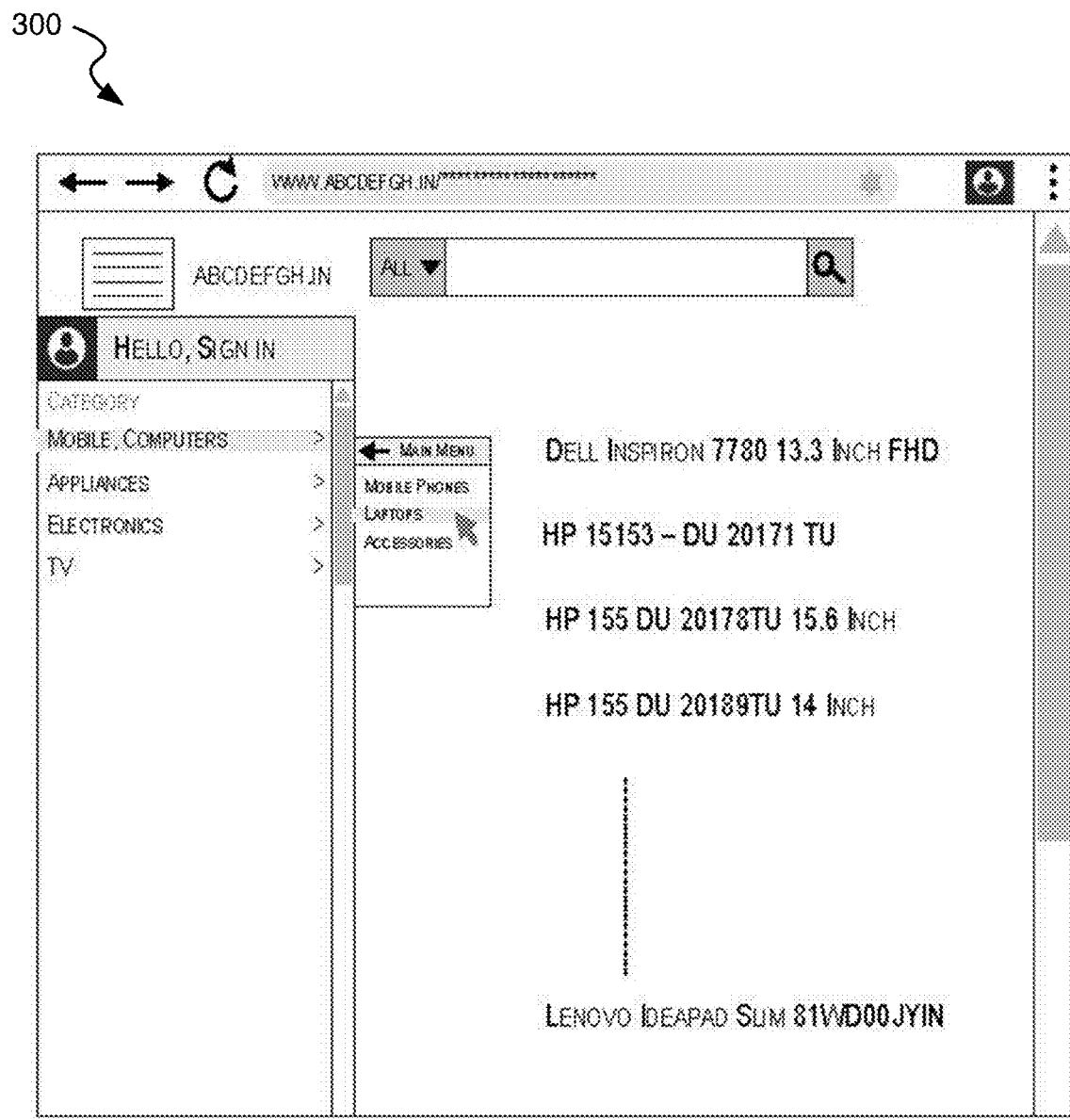
FIGS. 3A-3C are example web page accesses showing a two-tiered structured database access that can be used in relation to various embodiments to perform host name based network device pre-identification.

Turning to FIG. 3A, an example of accessing a structured database to obtain a list of network devices in accordance with some embodiments. As shown, an example webpage (i.e., "www.ABCDEFGH.in") is accessed with a request for "MOBILE, COMPUTERS". In response to the request, the structured database provides a list of mobile computers (i.e., Dell™ Inspiron™ 7780 13.3 inch FHD, HP™ 15153—DU 20171 TU, HP™ 155—DU 20178TU 15.6 inch, HP™ 155—DU 20189TU 14 inch, . . . , and Lenovo™ Ideapad™ Sum 81WD00 JYIN). As shown, the elements of the list each includes a manufacturer's name. In such a case, another structured database maintained by the respective manufacturer can be accessed using the particular product(s) obtained from the prior structured database (i.e., "www.ABCDEFGH.in") to identify additional network devices. Thus, for example, the Dell™ webpage may be accessed to search for "Inspiron" which may return additional models of the Dell™ Inspiron. In such a case, the aforementioned list of mobile computers is augmented with the additional network devices accessed from the subsequent structured database.

Returning to FIG. 1A, network device pre-recognition and discovery system 110 selects the first/next network device in the list of network devices, and extracts keywords for the selected network device from the name of the network device. For example, where the list of network devices includes the aforementioned "Dell™ Inspiron™ 7780 13.3 inch FHD", extracting the keywords yields the following string "Dell Inspiron 7780 13.3 inch".

Figures 3B, 3C:
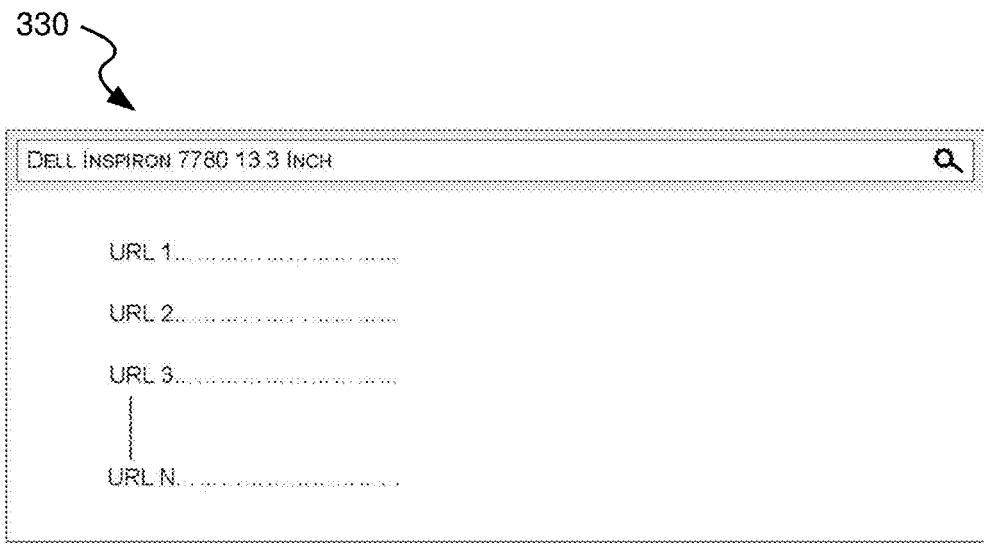

This extracted string is assembled by network device pre-recognition and discovery system 110 into a web search request. This may include copying the string into a search input of a selected web search engine 106. Network device pre-recognition and discovery system 110 launches the web search request using the assembled string. Any search engine 106 known in the art may be used to search the Internet for the extracted search string. In response to the search request, the selected search engine 106 returns a list of uniform record locators (URLs) ranked in order of relevance to the extracted string. A programmable number (N) of the URLs are selected. Turning to FIG. 3B, an example web page 330 of returned URLs (i.e., URL 1, URL 2, URL 3, . . . URL N) is shown for the search string "Dell Inspiron 7780 13.3 inch". Turning to FIG. 3C, a brand name 362 of the selected network device and a device type 364 of the selected network device are included in a pre-recognized device keyword dataset 360. Device type 364 is designated based upon the initial access to the structured database where the device type was used to search the structured database. Brand name 362 may also be identified based upon the device listings from the structured database. In addition, each of the URLs 366 returned from the web search using the string extracted from the list of network devices are listed, and each of the keyword string sets 368 used for the web search are included in pre-recognized device keyword dataset 360 for the selected network device.

Returning to FIG. 1A, the pre-recognized device URL sets are stored to pre-recognized device database 112. Network device pre-recognition and discovery system 110 repeats the aforementioned process of transforming product name information into URL sets and storing the URL sets datasets to pre-recognized device database 112 for a large number of identified network devices.

In operation, the aforementioned discovering one or more connected network devices 104 using information maintained in pre-recognized device database 112 includes network device pre-recognition and discovery system 110 identifying a connected network device 104 on network 102. This identification can be done using any process known in the art whereby a network is accessed and devices on the network are identified. In some embodiments, a commercially available network scanner is used to scan IP addresses on a network to which the system is connected. Based upon the disclosure provided herein, one of ordinary skill in the art will recognize a variety of approaches for identifying network devices that may be used in relation to different embodiments.

The connected network devices are identified by a host name. In some cases the host name is set by a user, but in many cases the host name is that set by the manufacturer. In either case, most often the host name includes some indication as to the type of network device and sometimes the brand and model number of the device. Network device pre-recognition and discovery system 110 extracts keywords from the host name of the identified connected network device 104. For example, the host name may be "Hikvision IP camera" or "Joe's Dell Laptop". For the first example, a keyword string of "Hikvision IP camera" is extracted as it does not include words that are reasonably expected to be personalized. In the second example, a keyword string of "Dell Laptop" is extracted as the word "Joe' s" is reasonably expected to be personalized.

Network device pre-recognition and discovery system 110 assembles the extracted string into a web search request. This may include copying the string into a search input of a selected web search engine 106. Network device pre-recognition and discovery system 110 then launches a web search request using the assembled string. Any search engine known in the art may be used to search the Internet for the extracted search string. In response to the search request, search engine 106 returns a list of uniform record locators (URLs) ranked in order of relevance to the extracted string. Network device pre-recognition and discovery system 110 selects a programmable number (N) of the URLs. In some embodiments, the top N ranked URLs are selected. Network device pre-recognition and discovery system 110 compares these URLs against URLs for each network device included in pre-recognized device database 112.

This comparison process includes calculating a similarity between the identified connected device URLs and the corresponding URLs for the currently selected network device data from pre-recognized device database 112, and the calculated similarity for each of the sets of URLs is stored in a memory (e.g., database 112 or another memory coupled to network device pre-recognition and discovery system 110).

In some embodiments, the similarity is calculated using a Jaccard index calculation. Such a Jaccard index is used to calculate a similarity between each of the URL sets generated based upon the host name of the identified connected network device 104 and URL sets generated based upon the network device names obtained from the structured database 108. The following is an example Jaccard coefficient equation where U is a set (i.e., URL for the identified connected network device and URL for the network device identified from the structured database) and A (i.e., URL for the identified connected network device) and B (i.e., URL for the network device identified from the structured database) of U:

$$J(A, B) = \frac{|A \cap B|}{|A \cup B|}$$

As shown, the Jaccard index (i.e., J(A,B)) is the ratio of the number of elements of their intersection and the number of elements of their union. The value of the Jaccard index is 0 when the two subsets are disjoint, and 1 when the two subsets are equal. The Jaccard index exhibits a value between 1 and 0 when the two subsets are neither equal nor disjoint, and the more similarity there is between the two subsets the Jaccard index is closer to 1. Based upon the disclosure provided herein, one of ordinary skill in the art will recognize other distance or similarity calculations that are known in the art that can be used in relation to different embodiments.

This process of comparing the URLs of the identified connected network device 104 continues until comparisons with all sets of URLs in pre-recognized device database 112 have been considered in relation to the set of URLs for the connected network device. Once all sets of URLs in pre-recognized device database 112 have been considered, network device pre-recognition and discovery system 110 selects the network device in pre-recognized device database 112 with a set of URLs that has the highest similarity to a set of URLs of identified connected network device 104. One or more security rules that were previously assigned to the selected network device from pre-recognized device database 112 is/are selected by network device pre-recognition and discovery system 110, and network device pre-recognition and discovery system 110 applies the selected security rule(s) to the identified connected network device 104. Based upon the disclosure provided herein, one of ordinary skill in the art will recognize a variety of security rules and/or other parameters that can be assigned to respective network devices identified in pre-recognized device database, and used to apply to an identified connected network device that is found to be similar using the approach discussed herein.

Figure 1B:
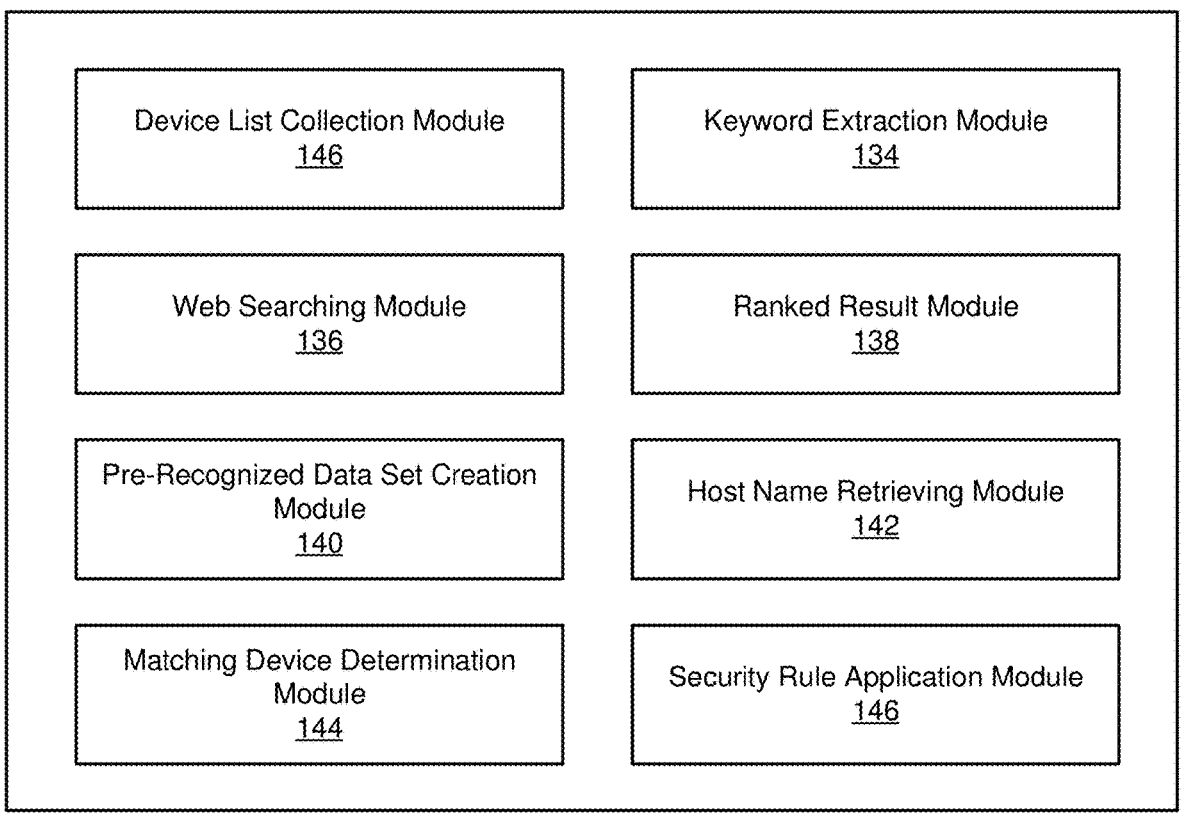

Turning to FIG. 1B, functional modules of a network device pre-recognition and discovery system 130 is shown in accordance with some embodiments. In some embodiments, network device pre-recognition and discovery system 130 may be used in place of network device pre-recognition and discovery system 110.

A device list collection module 132 controls the above described process of identifying network devices using information accessed from structured database 108. A keyword extraction module 134 controls the above described processes of: extracting keywords from network device names retrieved from structured database 108, and extracting keywords from host names of identified connected network devices 104. A web searching module 136 controls the above described processes of launching a web search, and a ranked result module 138 controls the processes of selecting the N highest ranked URLs provided as part of a web search. A pre-recognized data set creation module 140 controls the above described process of assembling a data set including a device name and URL sets for each of the identified network device types, and storing the assembled data set to pre-recognized device database 112. A host name retrieving module 142 controls the above described process of identifying connected network devices 104 on network 102, and providing their respective host names. A matching device determination module 144 controls the processes of calculating similarity, and selecting the network device in pre-recognized device database 112 that is most similar to the identified connected network device 104. A security rule application module 146 controls the above described process of selecting one or more security rules associated with the selected network device in pre-recognized device database 112, and applying the selected security rule to the identified connected network device 104.

Figure 1C:
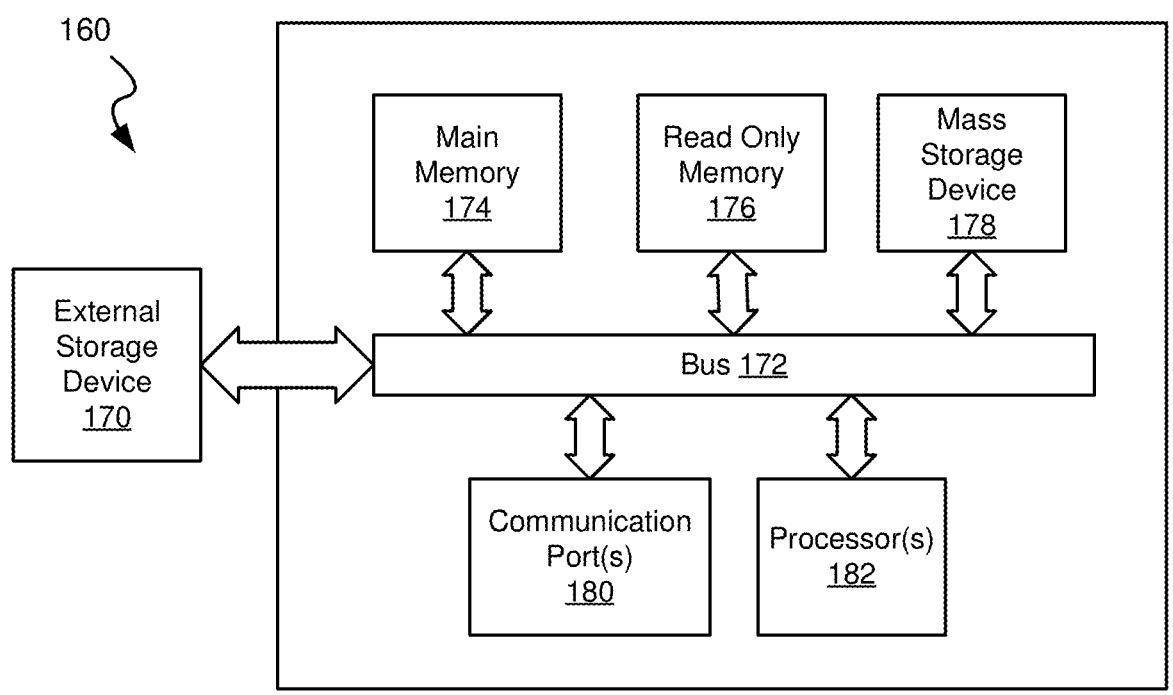

Turning to FIG. 1C, an exemplary computer system 160 in which or with which embodiments of the present invention may be utilized is shown. As shown in FIG. 1C, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces, e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives, IOMEGA® Zip Drives, Compact Disc—Read-Only Memory (CD-ROM), Compact Disc—Re-Writable (CD-RW), Digital Video Disk—Read Only Memory (DVD-ROM). The components described above are meant only to exemplify various possibilities. In no way should the aforementioned exemplary computer system limit the scope of the present disclosure.

Figure 2:
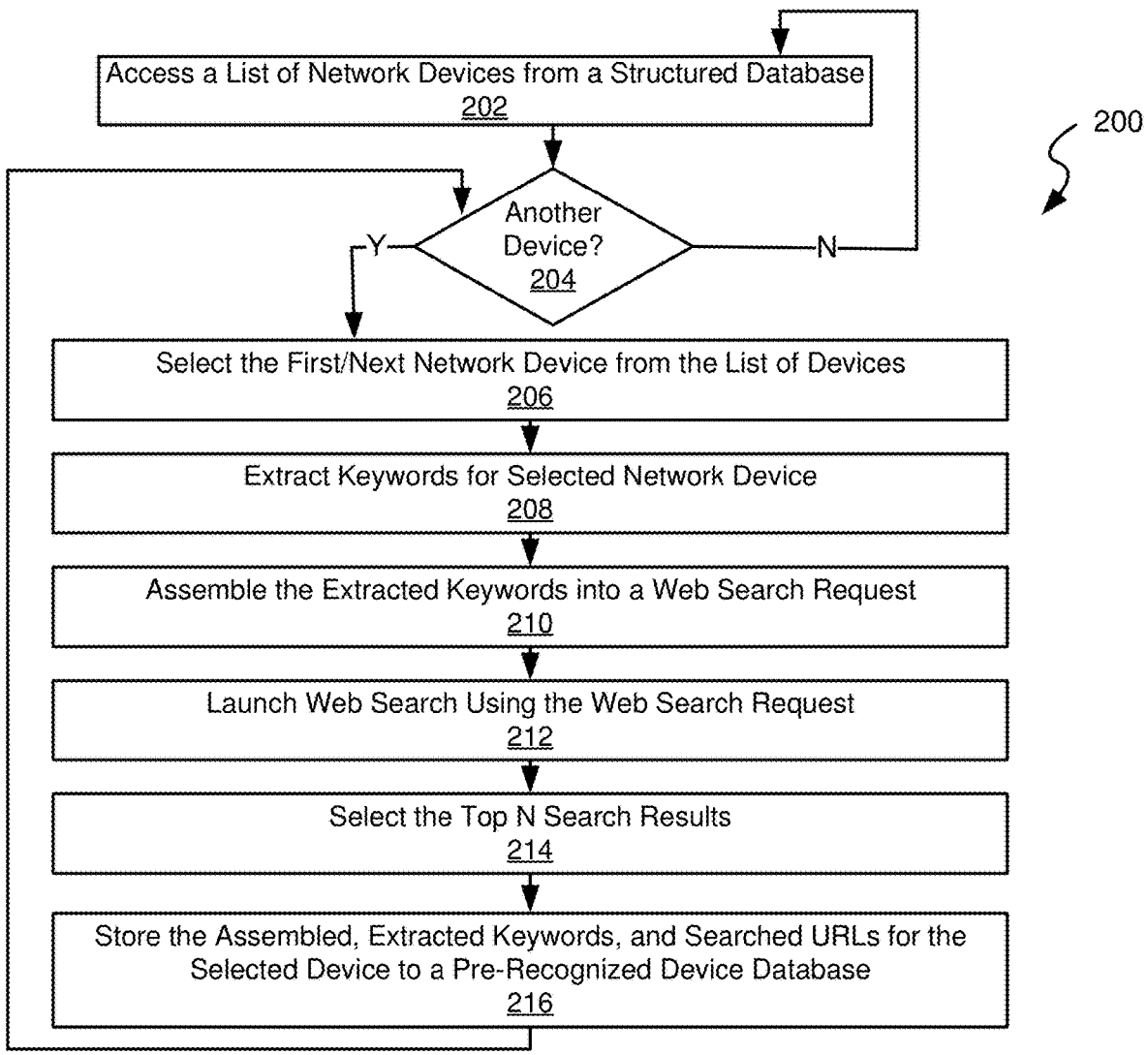
FIG. 2 is a flow diagram showing a method in accordance with some embodiments for host name based network device pre-recognition.

Turning to FIG. 2, a flow diagram 200 shows a method in accordance with some embodiments for host name based network device pre-recognition. Following flow diagram 200, a list of network devices are accessed from a structured database (block 202). This can include accessing any structured database that is available, and accessing a list of network devices from the structured database. As a particular example, a search for a particular type of network device may be performed at the Amazon.com™ webpage. In turn, the webpage responds by listing a number of the particular type of network devices that are available. It is noted that while Amazon.com™ is used as an example structured database that can be accessed, that any structured database may be used in accordance with embodiments discussed herein.

FIG. 3A shows an example of accessing a structured database to obtain a list of network devices in accordance with some embodiments. As shown, an example webpage (i.e., "www.ABCDEFGH.in") is accessed with a request for "MOBILE, COMPUTERS". In response to the request, the structured database provides a list of mobile computers (i.e., Dell™ Inspiron™ 7780 13.3 inch FHD, HP™ 15153—DU 20171 TU, HP™ 155—DU 20178TU 15.6 inch, HP™ 155—DU 20189TU 14 inch, . . . , and Lenovo™ Ideapad™ Sum 81WD00 JYIN). As shown, the elements of the list each includes a manufacturer's name. In such a case, another structured database maintained by the respective manufacturer can be accessed using the particular product(s) obtained from the prior structured database (i.e., "www.ABCDEFGH.in") to identify additional network devices. Thus, for example, the Dell™ webpage may be accessed to search for "Inspiron" which may return additional models of the Dell™ Inspiron. In such a case, the aforementioned list of mobile computers is augmented with the additional network devices accessed from the subsequent structured database.

Returning to FIG. 2, the processes of blocks 206-216 are repeated for each device in the list of network devices generated as part of the process of block 202. It is determined whether there is another network device in the list of network devices (block 204). Where no additional network devices remain to be processed (block 204), the pre-recognition of network devices completes until additional network devices are identified (block 202).

Alternatively, where additional network devices remain to be processed (block 204), the first/next network device in the list of network devices is selected (block 206). Keywords for the selected network device are extracted from the name of the network device. For example, where the list of network devices includes the aforementioned "Dell™ Inspiron™ 7780 13.3 inch FHD", extracting the keywords yields the following string "Dell Inspiron 7780 13.3 inch".

This extracted string is assembled into a web search request (block 210). This may include copying the string into a search input of a selected web search engine. A web search request using the assembled string is then launched (block 212). Any search engine known in the art may be used to search the Internet for the extracted search string. In response to the search request, the selected search engine returns a list of uniform record locators (URLs) ranked in order of relevance to the extracted string. A programmable number (N) of the URLs are selected (block 214). Turning to FIG. 3B, an example web page 330 of returned URLs (i.e., URL 1, URL 2, URL 3, . . . URL N) is shown for the search string "Dell Inspiron 7780 13.3 inch". Turning to FIG. 3C, a brand name 362 of the selected network device and a device type 364 of the selected network device are included in a pre-recognized device keyword dataset 360. Device type 364 is designated based upon the initial access to the structured database where the device type was used to search the structured database. Brand name 362 may also be identified based upon the device listings from the structured database. In addition, each of the URLs 366 returned from the web search using the string extracted from the list of network devices are listed, and each of the keyword string sets 368 used for the web search are included in pre-recognized device keyword dataset 360 for the selected network device.

Returning to FIG. 2, the pre-recognized device keyword dataset is stored to a pre-recognized device database (block 216). It is then determined whether any other network devices remain to be processed from the network device list (block 204). Where other network devices remain to be processed (block 204), the processes of blocks 206 et seq. are processed for the next network device. Alternatively, where no additional network devices remain to be processed (block 204), the pre-recognition of network devices completes until additional network devices are identified (block 202).

Figure 4:
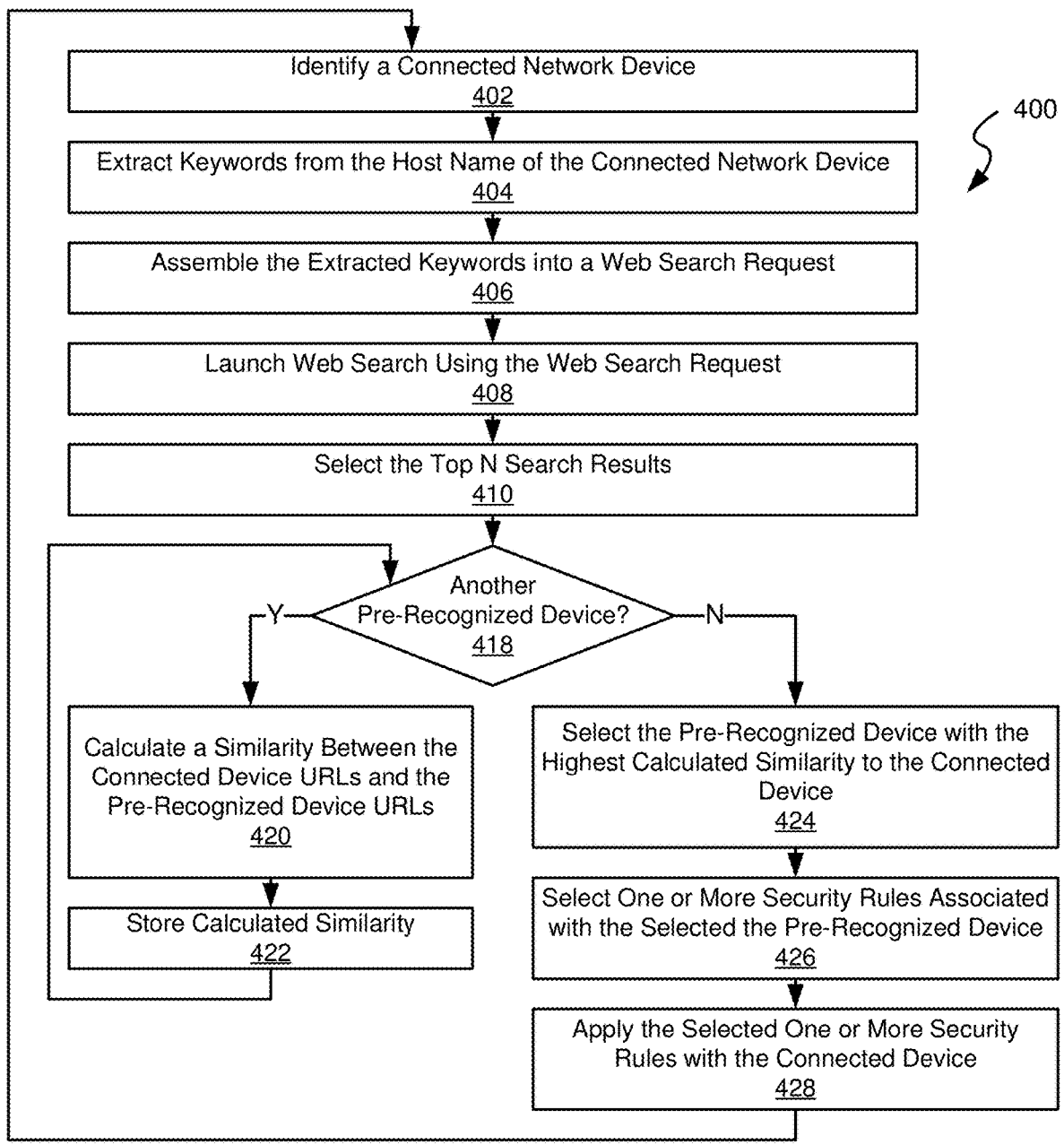
FIG. 4 is a flow diagram showing a method in accordance with various embodiments for performing network device discovery and group based governance.

Turning to FIG. 4, a flow diagram 400 shows a method in accordance with various embodiments for performing network device discovery and group based governance. Following flow diagram 400, a connected network device is identified (block 402). This can include any process known in the art whereby a network is accessed and devices on the network are identified. In some embodiments, a commercially available network scanner is used to scan IP addresses on a network to which the system is connected. Based upon the disclosure provided herein, one of ordinary skill in the art will recognize a variety of approaches for identifying network devices that may be used in relation to different embodiments.

The connected network devices are identified by a host name. In some cases the host name is set by a user, but in many cases the host name is that set by the manufacturer. In either case, most often the host name includes some indication as to the type of network device and sometimes the brand and model number of the device. Keywords are extracted from the host name of the identified connected network device (block 404). For example, the host name may be "Hikvision IP camera" or "Joe's Dell Laptop". For the first example, a keyword string of "Hikvision IP camera" is extracted as it does not include words that are reasonably expected to be personalized. In the second example, a keyword string of "Dell Laptop" is extracted as the word "Joe's" is reasonably expected to be personalized.

This extracted string is assembled into a web search request (block 406). This may include copying the string into a search input of a selected web search engine. A web search request using the assembled string is then launched (block 408). Any search engine known in the art may be used to search the Internet for the extracted search string. In response to the search request, the selected search engine returns a list of uniform record locators (URLs) ranked in order of relevance to the extracted string. A programmable number (N) of the URLs are selected (block 410).

These retrieved URLs are compared against URLs for each network device included in a pre-recognized device database (block 418). This comparison process includes calculating a similarity between the identified connected device URLs returned as part of the web search and the corresponding URLs for the currently selected network device data from the pre-recognized device database (block 420), and the calculated similarity for each of the strings is stored in a memory (block 422). For example, the host name of the connected network device may include the keyword "RM-1072" and the product listing from the structured database included the keywords "microsoft lumia 640 lte".

A web search for "RM-1072" and another web search for "microsoft lumia 640 lte" both return two identical URLs in their top N results (e.g., https://www.amazon.ca/Microsoft-Nokia-640-Unlocked-Smartphone/dp/B00WT9KSE8; and https://www.gsmarena.com/microsoft_lumia_640_lte-7055.php). Such a direct match of two of the top N URLs for each of the pre-recognized network device and the connected network device suggest that the network devices are the same type of network device.

In some embodiments, the similarity is calculated using a Jaccard index calculation. Such a Jaccard index is used to calculate a similarity between each of the URLs returned based upon keywords from the host name of the identified connected network device and URLs returned based upon keywords from the network device names obtained from the structured database (see the discussion above in relation to FIG. 2). The following is an example Jaccard coefficient equation where U is a set (i.e., keyword string for the identified connected network device and keyword string for the network device identified from the structured database) and A (i.e., keyword string for the identified connected network device) and B (i.e., keyword string for the network device identified from the structured database) of U:

$$J(A, B) = \frac{|A \cap B|}{|A \cup B|}$$

As shown, the Jaccard index (i.e., J(A,B)) is the ratio of the number of elements of their intersection and the number of elements of their union. The value of the Jaccard index is 0 when the two subsets are disjoint, and 1 when the two subsets are equal. The Jaccard index exhibits a value between 1 and 0 when the two subsets are neither equal nor disjoint, and the more similarity there is between the two subsets the Jaccard index is closer to 1. Based upon the disclosure provided herein, one of ordinary skill in the art will recognize other distance or similarity calculations that are known in the art that can be used in relation to different embodiments.

This process of comparing the URLs of the identified connected network device continues until comparisons with all URLs in the pre-recognized device database have been considered (block 418). Once all URLs in the pre-recognized device database have been considered (block 418), the network device in the pre-recognized device database with set of N URLs that has the highest similarity to one of the sets of N URLs of the identified connected network device is selected (block 424). One or more security rules that were previously assigned to the selected network device from the pre-recognized device database is/are selected (block 426), and the selected security rule(s) are applied to the identified connected network device (block 428). Based upon the disclosure provided herein, one of ordinary skill in the art will recognize a variety of security rules and/or other parameters that can be assigned to respective network devices identified in pre-recognized device database, and used to apply to an identified connected network device that is found to be similar using the approach discussed in relation to FIG. 4.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method for processing network traffic by a network security appliance using a classification database of network devices, the method comprising:

identifying, by a processor, a host name of a connected network device on a network, wherein the host name indicates a type of network device;

extracting, by the processor, at least a first keyword string indicating the type of network device from the host name;

launching, by the processor, a web search using at least the first keyword string to retrieve at least a first universal record locator (URL);

accessing, by the processor, a first pre-recognized network device record, wherein the first pre-recognized network device record indicates a first device type and includes at least a second URL;

calculating, by the processor, a similarity between the first URL and the second URL to yield a first similarity value;

accessing, by the processor, a second pre-recognized network device record, wherein the second pre-recognized network device record indicates a second device type and includes a third URL;

calculating, by the processor, a similarity between the first URL and the third URL to yield a second similarity value;

associating, by the processor, the connected network device with the first device type based at least in part on a comparison of the first similarity value and the second similarity value;

storing, by the processor, in a classification database an indication of the connected network device associated with the first device type; and applying a network security rule to a continuing stream of network traffic from the connected network device, wherein the network security rule is selected based at least in part on the first device type identified in the classification database.

2. The method of claim 1, wherein the web search is a first web search, wherein the processor is a first processor, the method further comprising:

forming the first pre-recognized network device record by:

accessing, by a second processor, a structured database to retrieve a list of network devices;

extracting, by the second processor, at least a second keyword string from a network device listing in the list of network devices; and launching, by the second processor, a second web search using at least the second keyword string to retrieve at least the second URL.

3. The method of claim 2, the method further comprising: storing, by the second processor, the first pre-recognized network device record to a pre-recognized device database.

4. The method of claim 2, wherein the list of network devices is a first list of network devices, the method further comprising:

forming the second pre-recognized network device record by:

accessing, by the second processor, the structured database to retrieve a second list of network devices;

extracting, by the second processor, at least a third keyword string from a network device listing in the second list of network devices;

launching, by the second processor, a third web search using at least the third keyword string to retrieve at least the third URL.

5. The method of claim 2, wherein the first processor is the same as the second processor.

6. The method of claim 2, wherein the list of network devices is a list of devices selected from a group consisting of: laptop computers, desktop computers, tablet computers, mobile telephones, audio input devices, audio output devices, video input devices, video output devices, and home appliance devices.

7. The method of claim 1, wherein the web search is a first web search, wherein the processor is a first processor, the method further comprising:

forming the first pre-recognized network device record by:

accessing, by a second processor, a structured database to retrieve a list of network devices;

extracting, by the second processor, at least a second keyword string from a network device listing in the list of network devices;

launching, by the second processor, a second web search using at least the second keyword string to retrieve at least the second URL and a fourth URL;

storing, by the second processor, the first pre-recognized network device record to a pre-recognized device database, wherein the first pre-recognized network device record further includes the fourth URL;

calculating, by the first processor, a similarity between the first URL and the fourth URL to yield a third similarity value; and wherein associating the connected network device with the first device type is based at least in part on a comparison of: the first similarity value and the second similarity value, and the third similarity value and the second similarity value.

8. The method of claim 1, wherein calculating, by the processor, the similarity between the first URL and the second URL to yield the first similarity value includes calculating a Jaccard index between the first URL and the second URL to yield a Jaccard index value, and wherein the the first similarity value is the Jaccard index value.

9. The method of claim 8, wherein associating, by the processor, the connected network device with the first device type when the first similarity value is greater than the second similarity value.

10. The method of claim 1, wherein the first keyword string includes at least a brand name and a model number.

11. A non-transitory computer-readable storage medium embodying a set of instructions, which when executed by one or more processing resources of a computer system, causes the one or more processing resources to perform a method comprising:

identifying a host name of a connected network device on a network, wherein the host name indicates a type of network device;

extracting at least a first keyword string indicating the type of network device from the host name;

launching a web search using at least the first keyword string to retrieve at least a first universal record locator (URL);

accessing a first pre-recognized network device record, wherein the first pre-recognized network device record indicates a first device type and includes at least a second URL;

calculating a similarity between the first URL and the second URL to yield a first similarity value;

accessing a second pre-recognized network device record, wherein the second pre-recognized network device record indicates a second device type and includes a third URL;

calculating a similarity between the first URL and the third URL to yield a second similarity value;

associating the connected network device with the first device type based at least in part on a comparison of the first similarity value and the second similarity value;

storing in a classification database an indication of the connected network device associated with the first device type; and applying a network security rule to a continuing stream of network traffic from the connected network device, wherein the network security rule is selected based at least in part on the first device type identified in the classification database.

12. The non-transitory computer-readable storage medium of claim 11, wherein calculating the similarity between the first URL and the second URL to yield the first similarity value includes calculating a Jaccard index between the first URL and the second URL to yield a Jaccard index value, and wherein the the first similarity value is the Jaccard index value.

13. The non-transitory computer-readable storage medium of claim 12, wherein associating the connected network device with the first device type when the first similarity value is greater than the second similarity value.

14. The non-transitory computer-readable storage medium of claim 11, wherein the first keyword string includes at least a brand name and a model number.

15. A network device classification system, the system comprising:

at least one processor;

a memory, wherein the memory includes instructions executable by the at least one processor to:

identify a host name of a connected network device on a network, wherein the host name indicates a type of network device;

extract at least a first keyword string indicating the type of network device from the host name;

launch a web search using at least the first keyword string to retrieve at least a first universal record locator (URL);

access a first pre-recognized network device record, wherein the first pre-recognized network device record indicates a first device type and includes at least a second URL;

calculate a similarity between the first URL and the second URL to yield a first similarity value;

access a second pre-recognized network device record, wherein the second pre-recognized network device record indicates a second device type and includes a third URL;

calculate a similarity between the first URL and the third URL to yield a second similarity value; and associate the connected network device with the first device type based at least in part on a comparison of the first similarity value and the second similarity value, store in a classification database an indication of the connected network device associated with the first device type; and apply a network security rule to a continuing stream of network traffic from the connected network device, wherein the network security rule is selected based at least in part on the first device type identified in the classification database.

16. The system of claim 15, wherein the memory is a first memory, wherein the web search is a first web search, wherein the processor is a first processor, and wherein the system further comprises:

a second processor;

a second memory, wherein the second memory includes instructions executable by the second processor to:

access a structured database to retrieve a list of network devices;

extract at least a second keyword string from a network device listing in the list of network devices;

launch a second web search using at least the second keyword string to retrieve at least a second URL; and store the first pre-recognized network device record to a database, wherein the first pre-recognized network device record includes at least the second URL and a portion of the network device listing in the list of network devices.

17. The system of claim 16, wherein the first processor is the same as the second processor.

18. The system of claim 16, wherein the first memory and the second memory are included in the same memory device.

19. The system of claim 15, wherein the web search is a first web search, wherein the processor is a first processor, the method further comprising:

forming the first pre-recognized network device record by:

accessing, by a second processor, a structured database to retrieve a list of network devices;

extracting, by the second processor, at least a second keyword string from a network device listing in the list of network devices; and launching, by the second processor, a second web search using at least the second keyword string to retrieve at least the second URL.

20. The method of claim 19, the method further comprising:

storing, by the second processor, the first pre-recognized network device record to a pre-recognized device database.

* * * * *